United States Patent [19]

Parker

[11] 4,201,158
[45] May 6, 1980

[54] LIVESTOCK RESTRAINING CHUTE

[76] Inventor: Floyd J. Parker, 86 E. 1700 South, Farmington, Utah 84025

[21] Appl. No.: 866,241

[22] Filed: Jan. 3, 1978

[51] Int. Cl.² .............................................. A61D 3/00
[52] U.S. Cl. ...................................... 119/98; 119/103
[58] Field of Search .................. 119/98, 99, 100, 101, 119/102, 103, 20; 49/379, 394, 385

[56] References Cited

U.S. PATENT DOCUMENTS

| | | | |
|---|---|---|---|
| 123,231 | 1/1872 | Brusoe | 119/100 |
| 216,129 | 6/1879 | A rless | 119/102 |
| 866,003 | 9/1907 | Davis | 119/100 |
| 2,591,191 | 4/1952 | Osmetti | 119/99 |
| 2,729,196 | 1/1956 | Breitenbach | 119/20 |

Primary Examiner—Hugh R. Chamblee
Attorney, Agent, or Firm—Mallinckrodt & Mallinckrodt

[57] ABSTRACT

A livestock restraining chute as specifically constructed has four uprights defining respective corners of a parallelepiped framework having substantially rectangular top, bottom, side and end faces and size sufficient to enclose an animal to be restrained. Restraining structures are attached to and extend between corresponding uprights at respective opposite side faces of the parallelepiped for restraining lateral movement of the animal. Restraining gate structure is provided to be openable and closeable with respect to two corresponding uprights that define one end face of the parallelepiped for providing entrance to the chute and for restraining rearward movement of the animal. Restraining structure is normally secured, by a manually releasable latch to the corresponding uprights that define the other end face of said parallelepiped, so as to restrain forward movement of the animal but to pivot downwardly by gravity and under the weight of the animal when free to do so by release of the latch.

9 Claims, 8 Drawing Figures

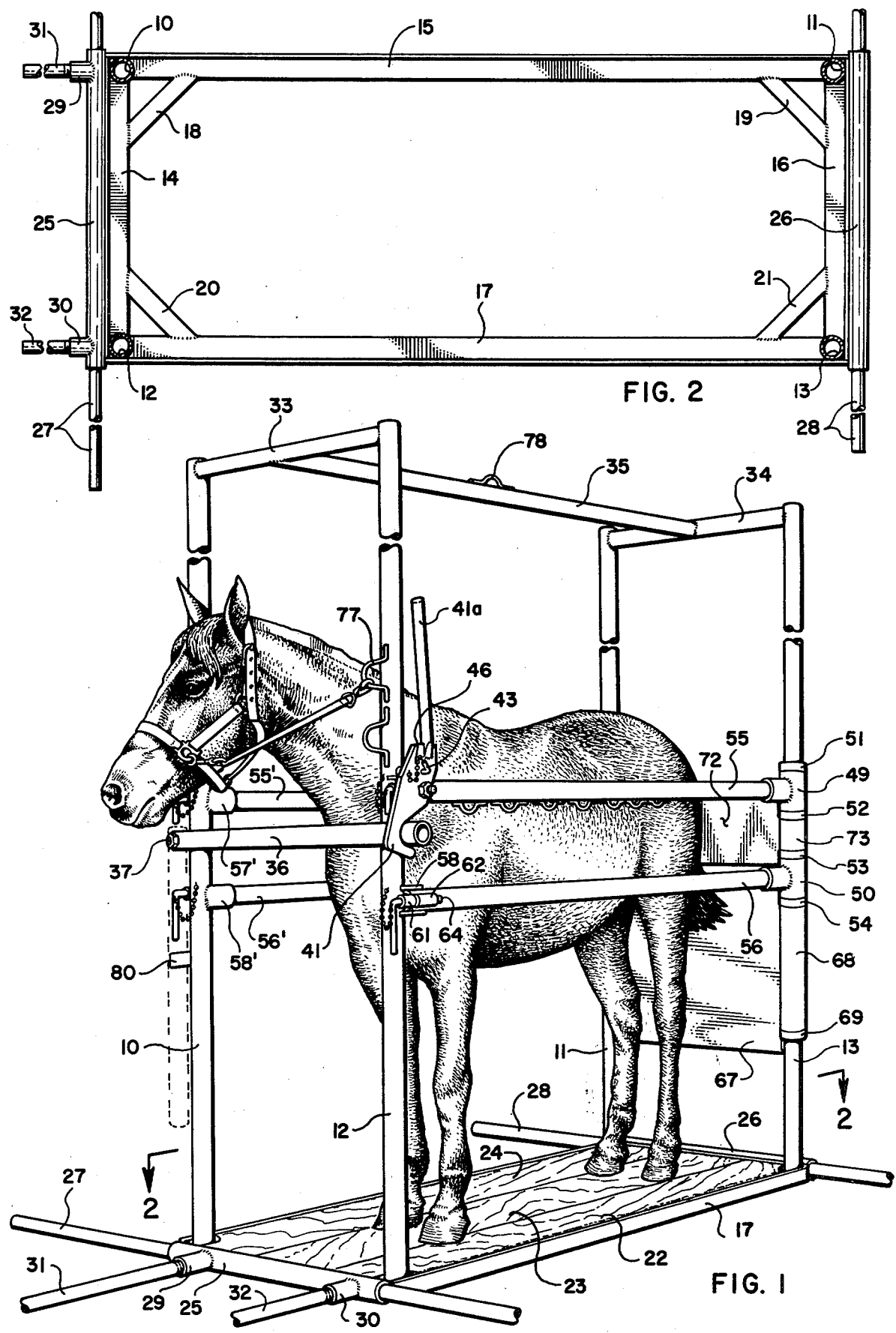

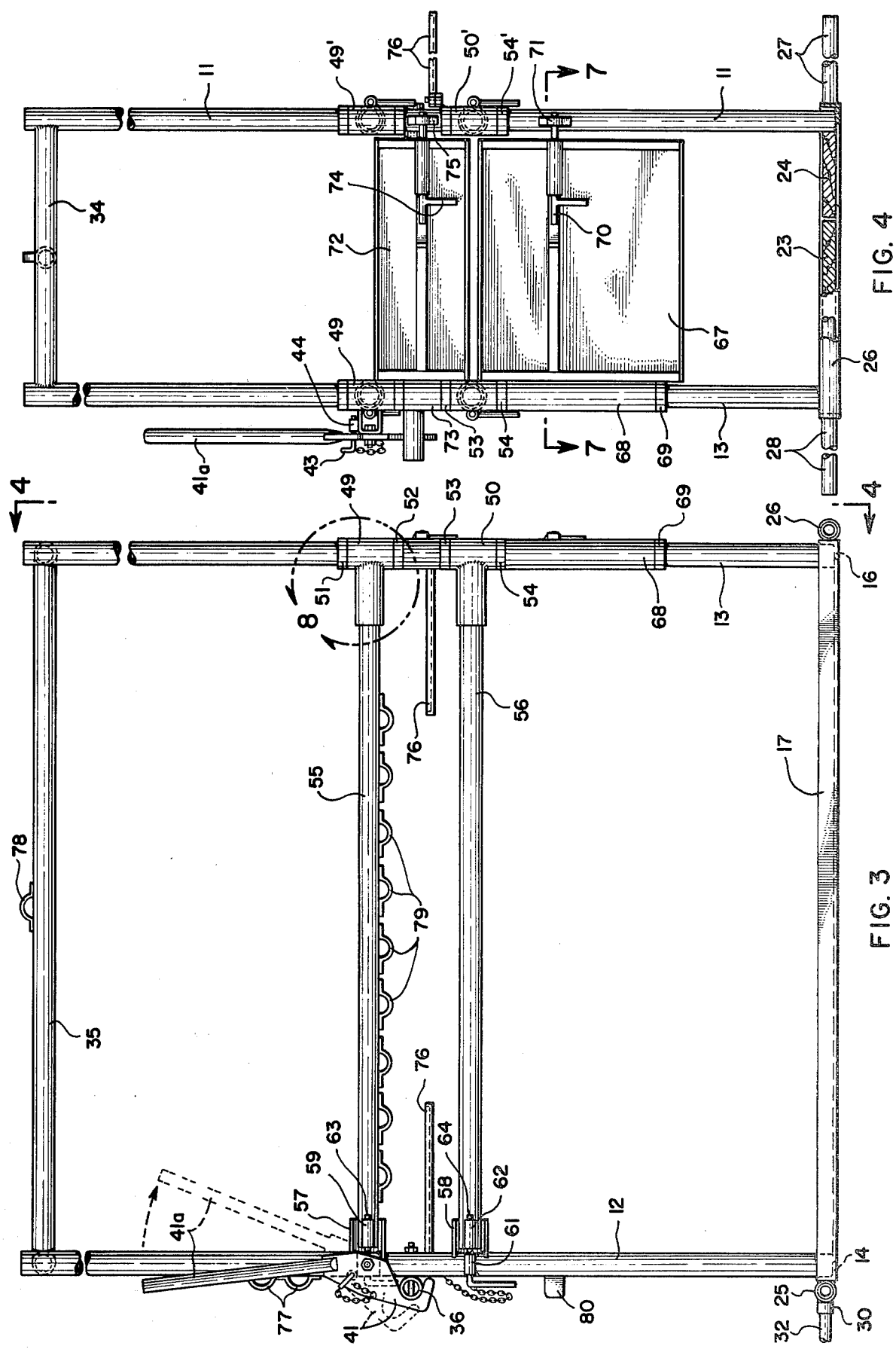

LIVESTOCK RESTRAINING CHUTE

BACKGROUND OF THE INVENTION

1. Field

The invention is in the field of restraining chutes for livestock, which restrain an animal from movement during certain handling or doctoring of the animal. It is particularly concerned with chutes designed to restrain horses.

2. State of the Art

Restraining chutes in general use today all have some form of stationary side and front restraining structure, and rear restraining structure which is openable and closeable to allow entry and exit of the animal to be restrained. Some chutes provide an openable and closeable front restraining structure in the form of a rail or rails, which are slid horizontally through brackets that hold them in horizontal restraining position, or in the form of gate structure which pivots outwardly.

A major problem with present restraining chutes is that it is not uncommon for an animal being restrained, such as a horse, to rear up and get his front legs over the front restraining structure and be hung up thereon. If the front cannot be opened, it is extremely difficult to lift the animal up and to get its legs back over the front restraining structure. Even in instances in which such front restraining structure is openable, as in some of the chutes presently available, it is difficult to open such structure under the weight of the animal. Thus, it is difficult to slide a rail horizontally out of its holding brackets with the weight of the animal bearing down on it, and it is almost impossible to open a gate outwardly under similar circumstances.

An additional problem with present restraining chutes is that, if an animal falls down, it is very difficult to get the animal back up or to remove the animal from the chute in its down position.

SUMMARY OF THE INVENTION

According to the invention, a livestock restraining chute from which an animal may be easily released is provided by making the restraining structure at the front of the chute manually releasable to pivot and drop by gravity and under the weight of the animal hung thereon.

It is preferred that the chute comprise four uprights defining respective corners of a parallelepiped framework having substantially rectangular top, bottom, side, and end faces and size sufficient to enclose an animal to be restrained. Restraining structures are attached to and extend between corresponding uprights at respective opposite lateral side faces of the framework for restraining lateral movement of the animal. Restraining gate structure is provided at the rear face of the framework for restraining rearward movement of the animal and for swinging open and closed with respect to the two corresponding uprights that define the rear end of the chute. The restraining structure at the front of the chute is normally secured, by a manually releasable latch arrangement, to the two corresponding uprights that define the front end face of the framework but is free to pivot and drop downwardly when the latch arrangement is released.

The front restraining structure constructed in this manner, so as to drop downwardly, is one of the particularly advantageous features of the invention, because it can be quickly and easily removed from restraining position despite the fact that the weight of an animal is resting thereon. The front legs of the animal are easily gotten back on the ground before injury can occur.

It is preferred that at least one of the side restraining structures be releasable by pivoting outwardly upon release from secured position, to free a fallen animal from the chute.

THE DRAWINGS

In the accompanying drawings, which illustrate an embodiment presently contemplated as the best mode of carrying out the invention:

FIG. 1 represents a perspective view of the restraining chute having a horse restrained therein;

FIG. 2, a view in horizontal section taken on the line 2—2 of FIG. 1, showing the bottom of the chute after horse and floor planks have been removed;

FIG. 3, a view in side elevation of the restraining chute itself, showing in dotted lines the "open" position of the manually releasable latch for the front restraining structure;

FIG. 4, a rear elevation;

FIG. 5, a top plan view;

FIG. 6, a fragmentary, exploded, pictorial view showing the manually releasable latch for the front restraining structure;

FIG. 7, a partial horizontal section taken on the line 7—7 of FIG. 4 to show only the rear restraining gate structure and its latch, dotted lines indicating how such gate structure swings open when unlatched; and FIG. 8, a fragmentary, exploded view of the structure encircled by the line 8 in FIG. 3, showing one of the hinge arrangements enabling the side restraining structure to swing outwardly of the chute.

DETAILED DESCRIPTION OF THE ILLUSTRATED EMBODIMENT

Figure 5:
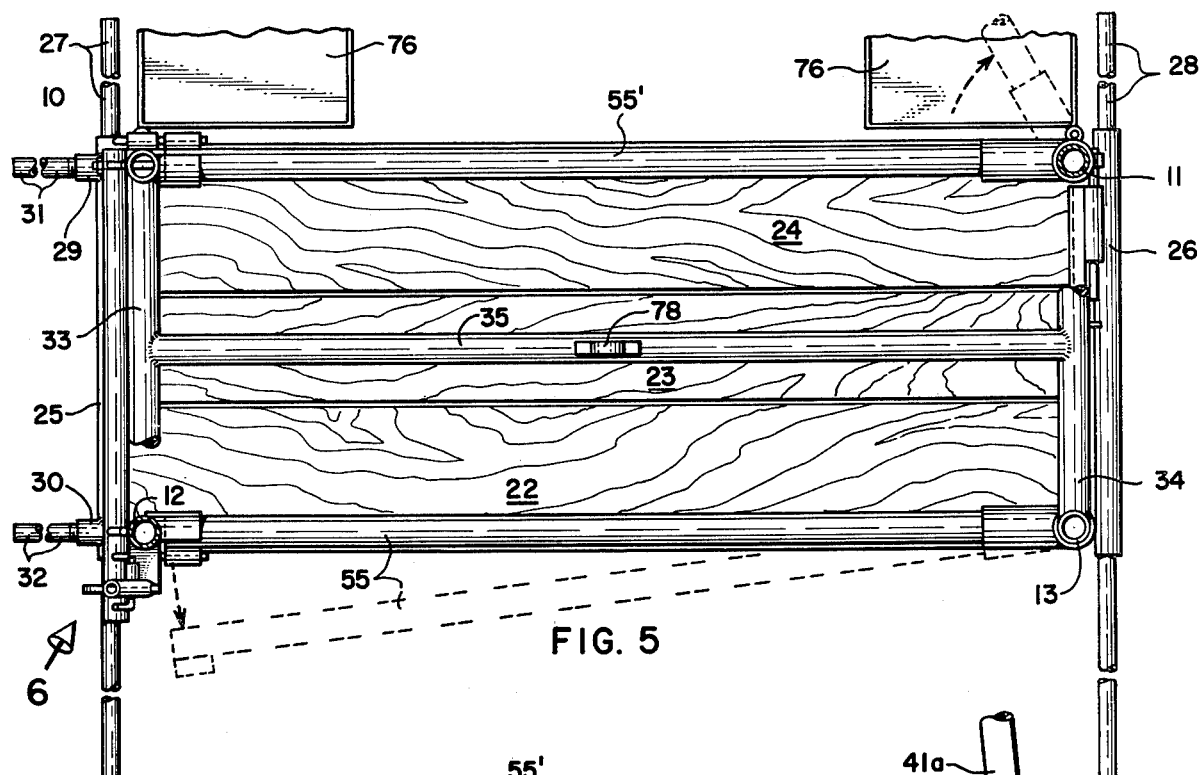

The embodiment of restraining chute shown in the drawings is defined by four corner posts 10, 11, 12, and 13, which define the respective corners of a parallelepiped framework having substantially rectangular top, bottom, side, and end faces and of size sufficient to enclose an animal to be restrained. The four posts are secured in place by welding them into the corners of a rectangular bottom frame preferably made up of steel structural angles 14, 15, 16, and 17. Corner braces 18, 19, 20, and 21, FIG. 2, of flat bar stock are welded in place to add strength and rigidity to the bottom frame.

Three planks 22, 23, and 24 are placed in and supported by the bottom frame to provide a floor for the restraining chute.

Attached to angles 14 and 16, respectively, are two inch diameter steel pipes 25 and 26, which provide slideways for one and one-half inch diameter steel pipes 27 and 28, respectively, that are slid into place through pipes 25 and 26. Pipes 27 and 28 are of length to extend beyond the sides of the chute to provide stability and insure that the chute will not fall over sideways. Short lengths of two inch pipe 29 and 30 are secured by welding to the ends of pipe 25 and one and one-half inch pipes 31 and 32 are slipped thereinto and extend outwardly therefrom to provide stabilization in the forward direction to prevent forward tipping of the chute.

Upper transverse frame members in the form of steel pipes 33 and 34 are secured by welding between respective sets of end posts 10 and 12 and 11 and 13, and a single longitudinal frame member 35, also in the form of a steel pipe, extends between and is welded to the transverse frame members 33 and 34 at their midpoints.

The structure described forms a very rigid, parallelepiped framework having open side, front, and rear faces.

The area between posts 10 and 12 defines the front face of the restraining chute, and, in accordance with the invention, this is normally latched closed by manually releasable restraining structure adapted to drop by gravity and under the weight of an animal when the latch is released. As shown, the restraining structure is provided by a horizontal bar 36 pivotally attached to post 10 by a bolt 37, FIG. 6, which is loosely secured in place by a nut 38 so bar 36 is free to drop down on the pivot axis provided by the bolt.

Figure 6:
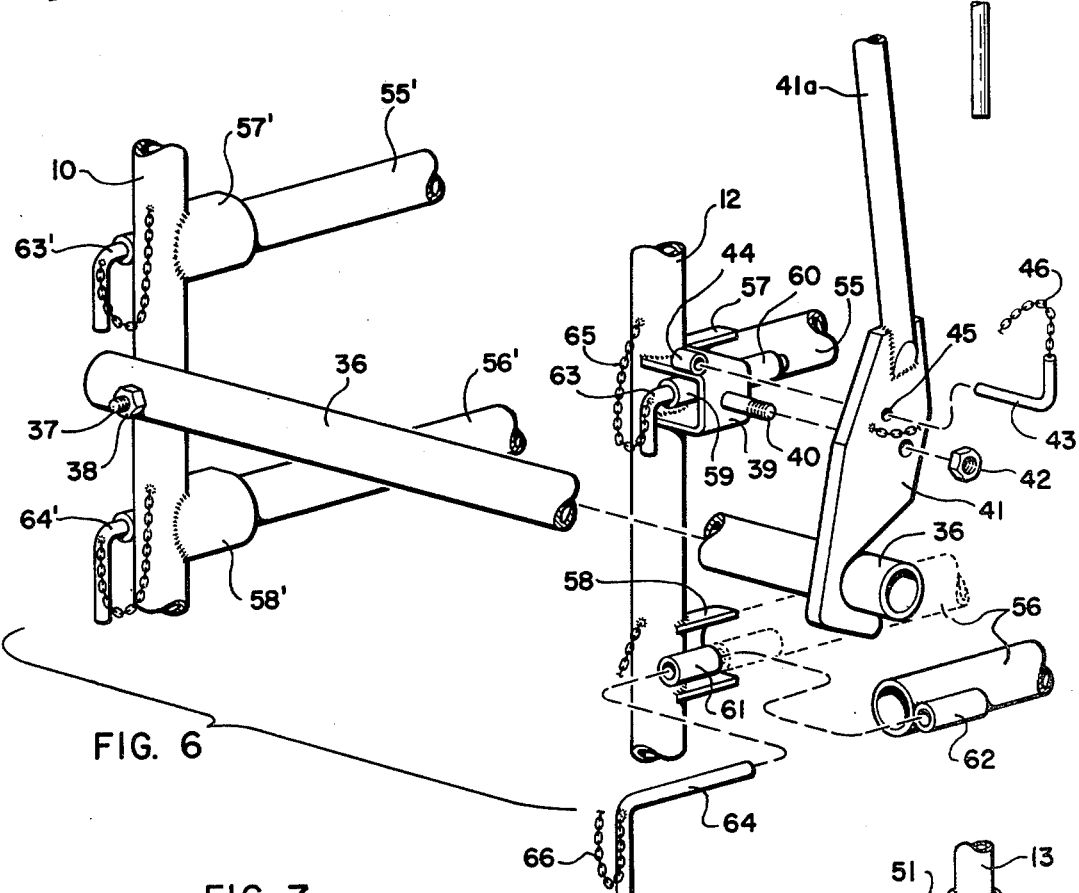
Figure 7:
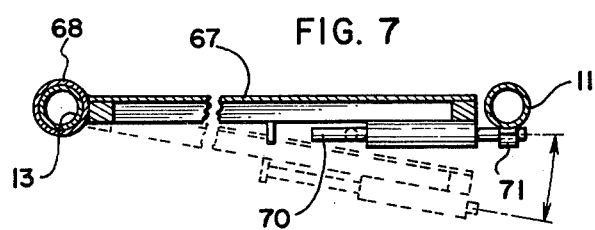
Figure 8:
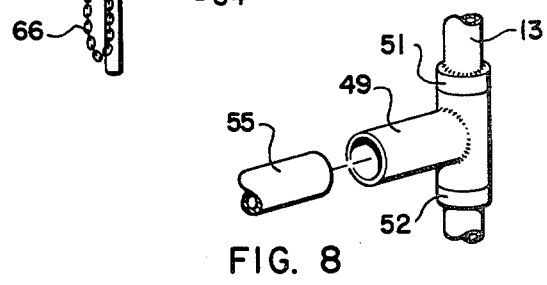

Manually releasable latch means attached to the post 12 comprises a box-like bracket 39, FIG. 6, welded to post 12 and a threaded pin 40 projecting securely therefrom as a pivot axis for latching hook 41, which is held in place by a nut 42. Latching hook 41, manually operated by handle 41a, receives the free end of bar 36 as a latch keeper when such bar is in its horizontal, animal-restraining position, and holds the bar in place against post 12. For securing latching hook 41 in this latched position, retaining means in the form of a removable locking pin 43 and receiving socket 44 is provided, such pin passing through an opening 45 provided therefor in latching hook 41. With pin 43 in locking position as described, latching hook 41 is prevented from pivoting about its axis pin 40 and is effectively locked in position so that bar 36 is securely held across the front of the chute even when an animal being worked on rears up and gets its front legs over the bar with its front quarters resting on the bar and its legs hanging outside the chute. If this should happen, the animal is easily returned to a full standing position by merely removing pin 43 and unlatching hook 41, thereby allowing bar 36 to drop about its pivot axis 37. When pin 43 is removed, it is held against loss by chain 46 attached to hook 41.

Handle 41a is of length sufficient to provide leverage for easily rocking latching hook 41 when bar 36 is under load, so as to relieve any binding that may occur on pin 43 and facilitate its removal.

Although a specific construction for the front restraining structure and its manually releasable latch means is here shown in accordance with the best mode presently contemplated of carrying out the invention, it can be readily appreciated that many structural variations are possible in attaining the functional effectiveness of the invention. Thus, for example, bars which extend halfway across the front of the chute could be pivotally attached to posts 10 and 12, respectively, so that both could be pivoted into horizontal position and latched in place. Also, the latching could be accomplished by other mountings for or by other forms of latches. Moreover, while the front restraining structure is here illustrated and described as comprising only a single cross bar 36 (this being presently preferred because it provides easy access to the animal for work on its neck and head as well as parts below the shoulders) other structures could be employed as long as they are manually releasable to drop downwardly.

With front restraining means adapted to function in this way, the remainder of the chute can be constructed as desired to provide lateral and rear restraint for an animal confined in the chute. Thus, the restraining means at the lateral sides of the framework could be fixed and a standard type of gate arrangement provided at the rear face of the framework. However, in accordance with the present invention, it is preferred that the side restraining structure be releasable manually from the front of the chute, much as is the front restraining structure, and that two independent gates be provided for the rear face of the framework.

As shown, pipe tees 49 and 50 are rotatably mounted on post 13, one above the other and between fixed keeper rings 51 and 52, and 53 and 54, respectively. Side rails 55 and 56 are rigidly fitted into and carried by the projecting stem portions of tees 49 and 50, respectively, to provide lateral restraining structure across the side face of the chute that extends between posts 12 and 13. To serve as retaining stops for limiting swinging movement of side rails 55 and 56, short lengths 57 and 58, FIG. 6, of half pipe are secured to upright 12 by welding, with their open faces directed outwardly so such rails can swing outwardly but not inwardly of the chute.

For locking rails 55 and 56 in their respective retaining stops 57 and 58, respective sets of sockets 59 and 60, and 61 and 62 are provided for receiving locking pins 63 and 64, respectively. Sockets 59 and 61 are welded securely to post 12 and sockets 60 and 62 are welded securely to the free ends of swinging side rails 55 and 56, respectively, so the two sockets of each set are in alignment when the rails are swung into closed position. When in such position, pins 63 and 64 are passed through the aligned sockets to lock the side rails in restraining position.

If it is desired to release such lateral restraining structure, to free an animal caught in the rails or one which has fallen down in the chute, or for other reasons, such as to expose the corresponding side of the animal for veterinary work (in which case one or the other of the side rails may be selectively released), pins 63 and/or 64 are removed manually and the desired side rail or rails swung outwardly.

If it is desired to remove such restraining structure completely, after the side rails 55 and 56 have been swung a short distance outwardly to clear post 12, the rails can be pulled from their supporting tees 49 and 50 and removed. Locking pins 63 and 64 are preferably anchored to the chute by chains 65 and 66, respectively, so they are not lost when the side rails are released.

A similar arrangement of manually releasable side rails (FIG. 6, same reference numbers primed) is preferably also provided as side restraining structure across the opposite side face of the chute framework between posts 10 and 11.

It is preferred that the restraining structure across the rear face of the chute framework between posts 11 and 13 be in the form of two gates, one positioned above the other. As shown, a lower gate 67 of sheet steel is hinged to post 13 by a length of pipe 68 secured to the gate and encircling post 13 as a sleeve. It is held in place by rings 54 and 69 fixed to the post. A sliding bolt arrangement, indicated generally at 70, FIG. 4, and receiving hasp 71, provide a manually releasable lock for securing gate 67 closed. A similar but narrower upper gate 72 is similarly hinged at 73 to post 13 and is provided with similar sliding bolt 74 and hasp 75.

Two gates as described are preferred from the standpoints of protection and convenience for the handler of the animal being restrained. With the relatively broad, lower gate 67 closed and the relatively narrow upper gate 72 open, various procedures involving the rear of the animal from the hocks up may be effectively performed, e.g. artificial insemination, castolestic, palpitation, etc. The risk of the handler being kicked during these procedures is eliminated. With upper gate 72 closed and lower gate 67 open, work may be performed on parts of the animal from the hocks down to and including the feet, such as work on capped hocks, rope burns, cuts and abrasions below the hocks, etc. The risk of the handler being kicked during these procedures is greatly reduced.

Trays 76 may be secured to appropriate ones of the framework posts, exteriorly of the chute, in an easily attached and detached manner for use in holding instruments, supplies, etc. to be used during work on an animal confined in the chute.

Eyelets of various kinds, such as those shown in front at 77, on top at 78, and along the side at 79, FIG. 3, may be secured to appropriate frame members for receiving animal restraining ties, slings, and the like used in handling or treating an animal while confined in the chute. For example, a sling is useful to immobilize and suspend an animal for work on injuries, such as broken bones or bad cuts.

It is advantageous to provide a limit strip 80, FIG. 3, on post 10 to limit the swing of bar 36 when it drops following release from its locked, restraining position across the front face of the chute framework.

Although the chute has been described as constructed of steel pipe and structural steel shapes, other suitable structural materials may be employed.

Whereas there is here illustrated and described an embodiment of animal restraining chute presently contemplated as the best mode of carrying out the invention in actual practice, it is to be understood that various changes may be made therein and other embodiments constructed without departing from the broader inventive concepts disclosed herein and comprehended by the claims that follow.

I claim:

1. A livestock restraining chute, comprising four uprights defining respective corners of a substantially parallelepiped framework of size sufficient to enclose an animal to be restrained and having substantially rectangular top and bottom faces and substantially rectangular and open side and front and rear faces; respective restraining structures attached to and normally extending between corresponding uprights at respective opposite side faces of said framework for closing said side faces and restraining lateral movement of said animal; restraining gate structure attached to and normally extending between but openable and closeable with respect to the two corresponding uprights that define the rear end face of said framework to provide entry into and exit from the chute for the animal and to restrain rearward movement of said animal within the chute; front restraining structure normally extending and releasably secured between the two corresponding uprights that define the front end face of said framework to restrain forward movement of the animal and, when released, to drop freely downwardly so as to open said opposite end face of the framework and free an animal hung up on said front restraining structure, said front restraining structure comprising a bar pivotally attached on a horizontal axis at one of its ends to one of the two front-face-defining uprights of the framework so as to pivot downwardly against the upright to which it is attached; and manually operable latch means carried by the other of the two front-face-defining uprights to receive and hold the free end of said bar when such bar is in substantially horizontal position across the open front face of said framework for normally securing said front restraining structure across said opposite, front face of the framework and for releasing such front restraining structure as and when desired, said latch means comprising a manually operated latching hook for engaging the free end of the bar as a keeper, and means for locking the latching hook in latched position.

2. A livestock restraining chute according to claim 1, wherein the latching hook is pivotally attached to its corresponding upright and has an elongate handle; wherein the locking means comprises an opening through the latching hook for the reception of a locking pin, and a socket carried by said upright in a position to receive said locking pin when the latching hook is in latched position, said handle providing leverage for rocking the latching hook to overcome any binding of said locking pin and enable easy removal thereof and release of the bar when weight of the animal being restrained is pressing downwardly on said bar.

3. A livestock restraining chute according to claim 2, wherein the side restraining structure at the side of the framework at which the latch means is positioned comprises a rail at about the height of said latch means and hinged to the rear one of the uprights between which it extends for swinging outwardly away from the animal being restrained; wherein an outwardly open, receiving member for the free end of said rail is secured to the upright by which said latch means is carried; wherein the latching hook is pivotally attached to its corresponding upright by means of a pivot pin projecting outwardly from securement to a bracket which spaces said pivot pin outwardly from said corresponding upright; and wherein manually releasable securement means for said rail is positioned on said bracket.

4. A livestock restraining chute according to claim 2, wherein the manually releasable securement means comprises a locking pin; a receiving socket for said pin fixed to the bracket; and a second receiving socket for said pin fixed to the free end of the rail so as to be in alignment with the first receiving socket and to receive the locking pin in common therewith when the rail is in its closed, animal restraining position.

5. A livestock restraining chute according to claim 1, wherein at least one of the restraining structures attached to and extending between corresponding uprights at respective opposite side faces of the framework is manually releasable.

6. A livestock restraining chute according to claim 5, wherein at least one of the restraining structures attached to and extending between corresponding uprights at respective opposite side faces of the framework comprises a pair of rails hinged, respectively, one above the other, to one of the uprights between which they extend and adapted to be locked into place between said uprights, so that said rails may be swung outwardly away from the animal being restrained when free to do so; and manually releasable latch means for freeing said rails to permit outward movement thereof.

7. A livestock restraining chute according to claim 6, wherein the side rails and uprights are lengths of pipe and the rails are hinged to the one upright by means of respective tees rotatably encircling said one upright and into the projecting stem portions of which are removably fitted ends of the respective rails, so that, if desired, the said rails may be pulled and separated from the tees when swung outwardly of the framework.

8. A livestock restraining chute according to claim 1, wherein the gate structure for restraining rearward movement of an animal within the framework of the chute comprises upper and lower gates indpendently mounted so that either one or both may be closed or opened independently of the other.

9. A livestock restraining chute according to claim 8, wherein the lower gate is relatively broad and the upper gate is relatively narrow.

* * * * *